March 2, 1943.    F. W. CALDWELL    2,312,624
COUNTER-ROTATING PROPELLER
Filed Dec. 30, 1939
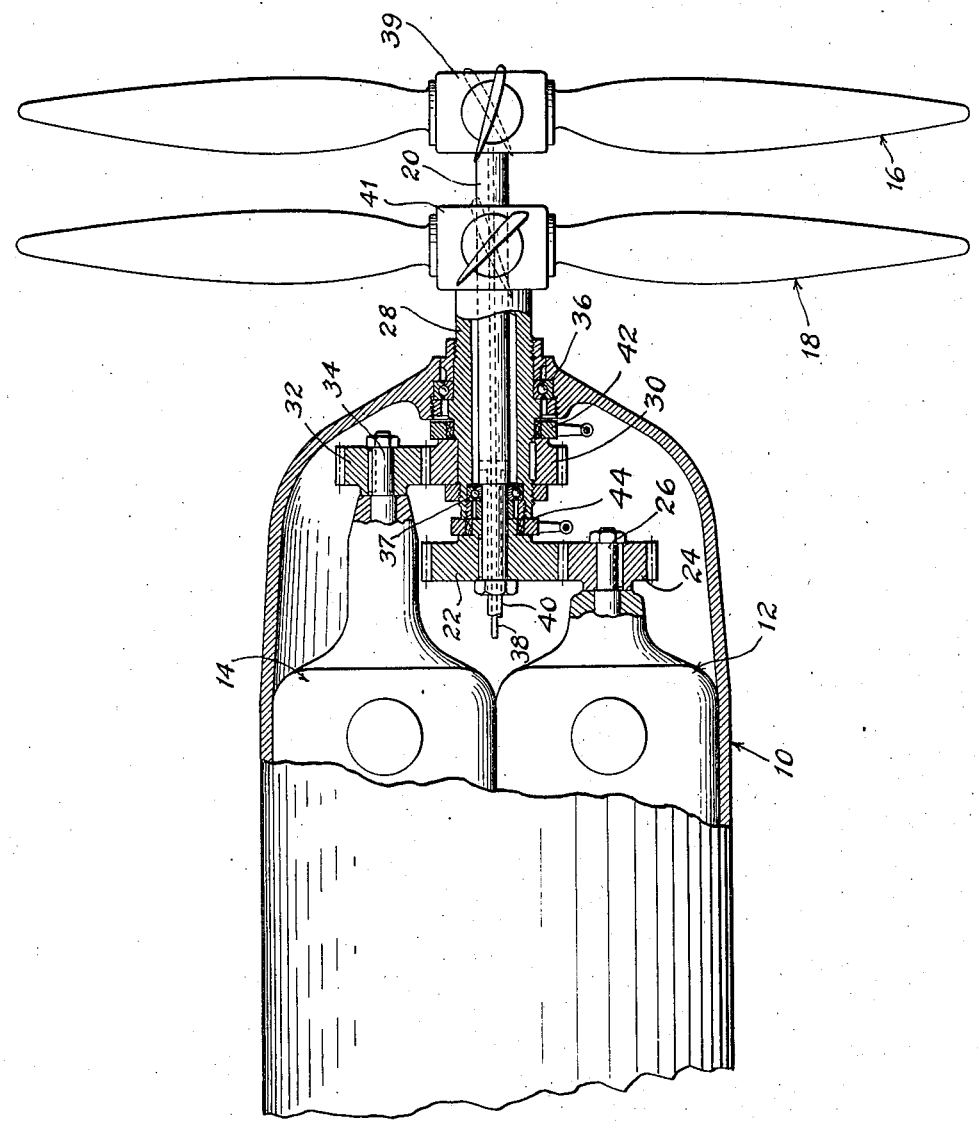
INVENTOR
FRANK W. CALDWELL
BY Harris G. Luther
ATTORNEY.

Patented Mar. 2, 1943

2,312,624

UNITED STATES PATENT OFFICE 2,312,624

COUNTERROTATING PROPELLER

Frank W. Caldwell, West Hartford, Conn., assignor to United Aircraft Corporation, East Hartford, Conn., a corporation of Delaware Application December 30, 1939, Serial No. 311,890

12 Claims. (Cl. 170—135.6)

This invention relates to improvements in aircraft power plants and has particular reference to improvements in an aircraft power plant utilizing two coaxial propellers rotatable in opposite directions.

An object of the invention resides in the provision of means for increasing the efficiency of one of a pair of coaxial propellers in the event the other propeller of the pair should become inoperative.

A somewhat more specific object resides in the provision in combination with a pair of coaxial controllable-pitch aeronautical propellers driven by individual power plants, of means for utilizing one of said propellers to increase the aerodynamic efficiency of the other propeller in case said one propeller should cease to rotate because of power plant failure or for other reasons.

A further object resides in the provision in combination with a pair of coaxial controllable-pitch propellers of means for adjusting an inoperative propeller of said pair to cooperate with the operative propeller of the same pair in such a manner that the drag or air resistance of the inoperative propeller is materially decreased.

Other objects and advantages will be more particularly pointed out hereinafter or will become apparent as the description proceeds.

In the accompanying drawing, in which like reference numerals are used to designate similar parts throughout, there is illustrated a suitable mechanical embodiment for the purpose of disclosing the invention. The drawing, however, is for purposes of illustration only and is not to be taken as limiting or restricting the invention as it will be apparent to those skilled in the art that various changes in the illustrated construction may be resorted to without in any way exceeding the scope of the invention.

In the drawing, the single figure is a plan view of an aircraft power plant including two engines and two coaxial propellers and driving connections between the engine and respective propellers, a portion of the power plant casing and driving connections being broken away and shown in section to better illustrate the construction thereof.

Referring to the drawing in detail, the numeral 10 generally indicates a supporting enclosure for an aircraft power plant, the numeral 12 generally indicates one engine mounted in the support, the numeral 14 generally indicates a second engine mounted in the support, the numeral 16 generally indicates a controllable-pitch propeller driven by the engine 12, and the numeral 18 generally indicates a controllable-pitch propeller driven by the engine 14.

The propeller 16 is carried on a shaft 20 which carries upon its inner end a gear 22 meshing with a gear 24 on the projecting end of the crankshaft 26 of the engine 12. The shaft 20 extends through a hollow shaft 28 which carries the propeller 18 and has upon its inner end a gear 30 meshing with a gear 32 carried on the projecting end of the crankshaft 34 of the engine 14. The hollow shaft 28 has a bearing 36 in the casing 10 and the inner shaft 20 has bearings, one of which is indicated at 37, in the hollow shaft 28. The pitch of the two propellers may be controlled by hydraulic fluid under pressure admitted through the concentric tubes 38 and 40 or by some equivalent arrangement. The tube 38 may lead to the pitch changing mechanism 39 of the propeller 16 and the tube 40 may lead to the pitch changing mechanism 41 of the propeller 18 through the hollow shaft 28. The pitch changing mechanisms, not illustrated in detail, may be of any suitable construction, such, for example, as is illustrated and described in United States Patent Number 2,174,717 issued October 3, 1939, to Frank W. Caldwell et al. for Multiposition controllable pitch propellers, and may be provided with adjustable positive pitch limit stops as are particularly illustrated and described in the aforesaid patent.

The propeller shaft 28 is provided within the housing 10 with a manually controllable brake 42 and the shaft 20 is provided with a similar brake 44. With this arrangement, if rotation of either one of the engines 12 or 14 should be discontinued, either accidentally because of engine failure or voluntarily in order to save fuel or engine wear, the associated propeller could be immediately brought to its limiting high pitch condition to minimize its drag and at the same time, locked against rotation by the associated brake 42 or 44.

In the accompanying drawing the forward propeller 16 has been illustrated as locked in an inoperative condition while the rear propeller 18 is operative.

The forward propeller would, in such a case, be held against rotation by the brake 44 and its blades would be turned to their limiting high pitch position as indicated by full lines in the drawing. The high pitch limit stop is so adjusted that the blades are turned slightly past their full feathered position in which their major surfaces are substantially parallel to the direction of the air stream flowing past them, and are set so as to impart a slight rotational effect to the airstream entering the rear propeller 18 in a direction opposite to the direction of rotation of the rear propeller. It has been found that the energy absorbed by the forward inoperative propeller in imparting such a counter rotational effect to the airstream is more than compensated by the increase in efficiency of the rear operative propeller and that by holding the forward propeller against rotation and adjusting its blades in the manner indicated the drag effect of the propeller is materially minimized and is somewhat less than that of an ordinary feathered propeller in the same circumstances. To put it another way, it may be said that the tractive efficiency of the pair of coaxial propellers when the forward propeller is inoperative is greater when the inoperative forward propeller is held against rotation and has its blades turned to a position slightly beyond their feathered position than when the blades are maintained in a feathered position in which their major surfaces are substantially parallel to the direction of airflow past the propeller and there is no tendency for the propeller to rotate.

In case the forward propeller is operative and the rear propeller is inoperative the blades of the forward propeller will have an operative pitch position such as is indicated by the dotted blade section on the forward propeller in the drawing and the rear propeller will be held against rotation by the brake 42 with its blades in a position slightly beyond the feathered position from the operative pitch range, as indicated by the dotted blade section on the rear propeller in the drawing.

Under these conditions, the airstream leaving the forward propeller will impinge against the blades of the rear propeller and most of the whirling motion given to the air by the rotating forward propeller will be removed by the non-rotating rear propeller. The energy thus absorbed by the rear propeller will produce a forward component on the rear propeller which will greatly minimize its drag effect.

While a suitable mechanical embodiment of the improved propeller control mechanism has been hereinabove described and illustrated in the accompanying drawing for the purpose of disclosing the invention, it is to be understood that the invention is not limited to the paricular arrangemen so illustrated and described, but that such changes in the size, shape and arrangements of the parts may be resorted to as come within the scope of the sub-joined claims.

Having now described the invention so that others skilled in the art may clearly understand the same, what it is desired to secure by Letters Patent is as follows:

1. In combination with a pair of coaxial propellers, individual pitch changing means operative to turn the propeller blades to a limiting pitch position somewhat beyond the feathered position of said blades, and individual means for maintaining either propeller against rotation when inoperative to constitute the inoperative propeller of said pair, when the blades thereof are in said limiting pitch position, an air guide to augment the aerodynamic efficiency of the alternative propeller.

2. In an aircraft power plant having two coaxial propellers and an independent drive for each propeller, an individual manually controllable brake for each propeller to restrain the respective propeller against rotation, each propeller including pitch changing means operative to move the blades thereof from the operative range of pitch angles to a position slightly beyond the position in which the major surfaces of said blades are substantially parallel to the direction of air flow past said propeller, whereby either propeller when restrained against rotation may be made to serve as an air guide for the remaining propeller.

3. The arrangement as set forth in claim 1, wherein the blades of the forward propeller may be rotated somewhat beyond their neutral position when feathered whereby they will impart a reverse rotational effect to the airstream entering the rearwardly disposed propeller.

4. In combination with a pair of independently driven, coaxial, controllable-pitch propellers, a stop for limiting the pitch changing movements of the blades of the rearmost of said pair of coaxial propellers to a position slightly past the position at which the major surfaces of said blades are substantially parallel to the direction of airflow past said propeller, and means for locking said propeller against rotation when said blades are in the position determined by said stop.

5. In combination with a pair of independently driven, coaxial, controllable-pitch propellers, a stop for limiting the pitch changing movements of the foremost of said pair of coaxial propellers to a position slightly past the position at which the major surfaces of said blades are substantially parallel to the direction of airflow past said propeller, and means for locking said propeller against rotation when said blades are in the position determined by said stop.

6. In an aircraft power plant having two coaxial propellers and an independent drive for each propeller, individual means operative to restrain each of said propellers against rotation, pitch changing means operative to turn the blades of each propeller independently in pitch changing directions and to turn said blades to a limiting pitch position in which the blades are positioned slightly beyond the position in which the major surfaces thereof are substantially parallel to the direction of airflow past said propeller, whereby either propeller when restrained against rotation may be made to serve as an air guide for the alternative propeller.

7. In combination, a pair of independently driven coaxial controllable-pitch propellers, a pitch limit stop for each propeller for limiting the pitch changing movements of the blades of the respective propellers to a position at which the relative wind past the propeller tends to rotate the propeller in a direction opposite to that in which the propeller is normally rotated, and means for locking either one of said propellers against rotation with its blades in the position determined by said pitch limit stop whereby either propeller when restrained against rotation may be made to serve as an air guide for the remaining propeller.

8. In a vehicle power plant comprising a pair of coaxial controllable-pitch propellers and means for rotating said propellers independently in opposite directions, means for holding one of said propellers against rotation, and means for turning the blades of the propeller so held to a pitch position at which aerodynamic forces acting on said propeller during flight tend to turn said propeller in the same direction as the direction of rotation of the other propeller.

9. In a vehicle power plant comprising a pair of coaxial controllable-pitch propellers and means for rotating said propellers independently in opposite directions, means selectively operable for holding either of said propellers against rotation, and means for turning the blades of the propeller held against rotation by said holding means to a pitch position at which aerodynamic forces acting on said propeller during flight tend to turn said propeller in the same direction as the direction of rotation of the propeller which is not held against rotation by said holding means.

10. In a vehicle power plant comprising a pair of coaxial oppositely rotating controllable-pitch propellers, means for holding one of said propellers against rotation, means for rotating said propellers in opposite directions including means for rotating the other propeller when one of said propellers is held against rotation, and means for turning the blades of the propeller so held to a pitch position at which aerodynamic forces acting on said propeller during flight tend to turn said propeller in the same direction as the direction of rotation of the other propeller.

11. In combination with a pair of coaxial oppositely rotating propellers, pitch changing means operative to turn the propeller blades of one of said propellers to a position beyond the feathered position, and means for maintaining said propeller against rotation to constitute said propeller, when the blades thereof are in said position, as an air guide to augment the aerodynamic efficiency of the other propeller.

12. In an aircraft power plant having two coaxial propellers, individual means operative to restrain each of said propellers against rotation, means for driving said propellers including means for driving the unrestrained propeller when the other propeller is restrained against rotation, pitch changing means operative to turn the blades of each propeller independently in pitch changing directions and to turn said blades to a limiting pitch position in which the blades are positioned slightly beyond the position in which the major surfaces thereof are substantially parallel to the direction of airflow past said propeller, whereby either propeller when restrained against rotation may be made to serve as an air guide for the alternative propeller.

FRANK W. CALDWELL.